United States Patent
Tonari et al.

(10) Patent No.: US 10,995,199 B2
(45) Date of Patent: May 4, 2021

(54) POLYAMIDE RESIN COMPOSITION

(71) Applicant: UBE INDUSTRIES, LTD., Ube (JP)

(72) Inventors: Masaya Tonari, Ube (JP); Seiichi Arakawa, Ube (JP); Akio Miyamoto, Ube (JP)

(73) Assignee: UBE INDUSTRIES, LTD., Ube (JP)

( * ) Notice: Subject to any disclaimer, the term of this patent is extended or adjusted under 35 U.S.C. 154(b) by 127 days.

(21) Appl. No.: 15/761,256

(22) PCT Filed: Oct. 3, 2016

(86) PCT No.: PCT/JP2016/079253
§ 371 (c)(1),
(2) Date: Mar. 19, 2018

(87) PCT Pub. No.: WO2017/061363
PCT Pub. Date: Apr. 13, 2017

(65) Prior Publication Data
US 2018/0273728 A1    Sep. 27, 2018

(30) Foreign Application Priority Data

Oct. 9, 2015 (JP) .............................. JP2015-200937

(51) Int. Cl.
*C08K 7/14* (2006.01)
*C08L 77/00* (2006.01)
*C08L 77/02* (2006.01)
*C08J 5/00* (2006.01)
*C08J 5/04* (2006.01)

(52) U.S. Cl.
CPC ................. *C08K 7/14* (2013.01); *C08J 5/00* (2013.01); *C08J 5/043* (2013.01); *C08L 77/00* (2013.01); *C08L 77/02* (2013.01); *C08J 2377/02* (2013.01); *C08K 2201/002* (2013.01); *C08K 2201/003* (2013.01)

(58) Field of Classification Search
CPC .... C08K 7/14; C08J 5/00; C08J 5/043; C08L 77/00; C08L 77/02
See application file for complete search history.

(56) References Cited

U.S. PATENT DOCUMENTS

| 2008/0167415 A1 | 7/2008 | Stoeppelmann et al. |
| 2009/0062452 A1 | 3/2009 | Harder et al. |
| 2010/0227972 A1 | 9/2010 | Katayama et al. |
| 2010/0279111 A1 | 11/2010 | Philipp et al. |
| 2013/0172460 A1 | 7/2013 | Mitadera et al. |

FOREIGN PATENT DOCUMENTS

| JP | 2-252759 A | 10/1990 |
| JP | 9-48914 A | 2/1997 |
| JP | 2002-167505 A | 6/2002 |
| JP | 2004-35888 A | 2/2004 |
| JP | 2009-79212 A | 4/2009 |
| JP | 2011-503307 A | 1/2011 |
| JP | 2011-57932 A | 3/2011 |
| JP | 12-153798 A | 8/2012 |
| JP | 2013-53316 A | 8/2012 |
| JP | 2014-34606 A | 2/2014 |
| JP | 2014-111779 A | 6/2014 |
| JP | 2014-111780 A | 6/2014 |
| JP | 2015-129243 A | 7/2015 |
| JP | 2015-129244 A | 7/2015 |
| JP | 2015-48440 A | 8/2015 |
| JP | 2015-145457 A | 8/2015 |
| WO | WO 2007/097214 A1 | 8/2007 |
| WO | WO 2012/046629 A1 | 4/2012 |

OTHER PUBLICATIONS

JP 2014-34606 (machine translation) (Year: 2014).*
International Search Report issued in PCT/JP2016/079253 (PCT/ISA/210), dated Dec. 20, 2016.

* cited by examiner

*Primary Examiner* — Edward J Cain
(74) *Attorney, Agent, or Firm* — Birch, Stewart, Kolasch & Birch, LLP

(57) ABSTRACT

The present invention provides a polyamide resin composition capable of simultaneously satisfying, with regard to a molded body, suppression of dimensional change upon water absorption, excellent abrasion resistance after water absorption, excellent impact strength, and high surface strength.

The present invention relates to a resin composition comprising a glass fiber having a non-circular cross section, and a polyamide resin having a structural unit having more than 6 carbon atoms per 1 amide group, wherein a number average molecular weight of the polyamide resin is 20000 to 40000, and a content of the glass fiber is 15 mass % to 60 mass %.

8 Claims, No Drawings

POLYAMIDE RESIN COMPOSITION

TECHNICAL FIELD

The present invention relates to a polyamide resin composition.

BACKGROUND ART

Polyamide resins have excellent characteristics as engineering plastics and have been widely used in various industrial fields, such as automobiles, machines, and electrical/electronic fields. Techniques in which a filler, such as a carbon fiber and a glass fiber, is blended to enhance mechanical properties of a polyamide resin have been known.

For example, a material for sliding components containing particular contents of polyamide 6 and a glass fiber having a non-circular cross section with the ratio of the major axis to the minor axis in the cross section being 1.2 to 10 has been proposed, and it is said that low warping property, high limiting PV value, low dynamic friction coefficient, and excellent abrasion resistance are achieved (e.g., see Patent Document 1). Furthermore, a reinforced polyamide molding material containing particular contents of a particular polyamide resin and a glass fiber having a non-circular cross section has been proposed, and it is said that a molded part having high transversal rigidity and transversal resistance can be produced (e.g., see Patent Document 2).

Meanwhile, a thermoplastic resin composition for laser welding, the thermoplastic resin composition containing particular contents of a thermoplastic resin such as a polyamide resin and a glass fiber having a flat cross section has been proposed, and it is said that excellent mechanical strength and excellent laser welding characteristics are achieved (e.g., see Patent Document 3).

PRIOR ART DOCUMENTS

Patent Documents

Patent Document 1: WO 2007/097214
Patent Document 2: Japanese Patent Application Kokai Publication No. 2014-111779 (unexamined, published Japanese patent application)
Patent Document 3: Japanese Patent Application Kokai Publication No. 2013-53316 (unexamined, published Japanese patent application)

SUMMARY OF THE INVENTION

Problems to be Solved by the Invention

However, with conventional polyamide resin compositions containing a glass fiber having a non-circular cross section, it has been difficult to simultaneously satisfy, with regard to a molded body, suppression of dimensional change upon water absorption, excellent abrasion resistance after water absorption, excellent impact strength, and high surface strength.

An object of the present invention is to provide a polyamide resin composition capable of simultaneously satisfying suppression of dimensional change upon water absorption, excellent abrasion resistance after water absorption, excellent impact strength, and high surface strength when a molded body is formed.

Means for Solving the Problems

The specific means for solving the problem described above is:
a polyamide resin composition comprising, a glass fiber having a non-circular cross section, and a polyamide resin having a structural unit having more than 6 carbon atoms per 1 amide group, wherein, a number average molecular weight of the polyamide resin is 20000 to 40000, and a content of the glass fiber is 15 mass % to 40 mass %.

Effect of the Invention

According to the present invention, a polyamide resin composition capable of simultaneously satisfying suppression of dimensional change upon water absorption, excellent abrasion resistance after water absorption, excellent impact strength, and high surface strength when a molded body is formed can be provided.

MODE FOR CARRYING OUT THE INVENTION

In the present description, when a plurality of substances that corresponds to each component is present in the composition, the content of the each component in the composition refers to the total amount of the plurality of substances present in the composition unless otherwise noted.

Polyamide Resin Composition

The polyamide resin composition according to the present embodiment containing a glass fiber having a non-circular cross section, and a polyamide resin having a structural unit having more than 6 carbon atoms per 1 amide group, wherein a number average molecular weight of the polyamide resin is 20000 to 40000, and a content of the glass fiber is 15 mass % to 60 mass %. When a molded body is formed from a polyamide resin composition obtained by allowing a polyamide resin having a structural unit having a large number of carbon atoms and having the number average molecular weight within a particular range to contain a particular content of a glass fiber having a non-circular cross section, dimensional stability upon water absorption, excellent abrasion resistance after water absorption, excellent impact strength, and high surface hardness can be achieved. The dimensional stability upon water absorption and excellent abrasion resistance after water absorption are achieved because the polyamide resin composition according to the present embodiment exhibits excellent low water absorbency.

Polyamide Resin

The polyamide resin is not particularly limited as long as the polyamide resin contains a structural unit having more than 6 carbon atoms per 1 amide group (hereinafter, also referred to as "particular structural unit"). The number of carbon atoms per 1 amide group in the particular structural unit is preferably 7 to 12, and more preferably 8 to 12, from the perspectives of dimensional stability upon water absorption, excellent abrasion resistance after water absorption, and impact resistance. Note that the number of carbon atoms per 1 amide group in the structural unit is, for example, 6 for polyamide 6 or polyamide 66, 11 for polyamide 11, 12 for polyamide 12, and 9 for polyamide 612.

The polyamide resin preferably has more than 6 average carbon atoms, more preferably 7 to 12, and even more preferably 8 to 12, per 1 amide group among the entire structural units. The average number of carbon atoms per 1 amide group among the entire structural units is, for example, 6 for a polyamide 6/66 copolymer, and 9 for a polyamide 6/12 copolymer (copolymer ratio 1:1).

Examples of the polyamide resin include polyamide resins formed from diamine and dicarboxylic acid, polyamide resins formed from lactam or aminocarboxylic acid, and polyamide resins formed from two or more types of these copolymers.

Examples of the diamine include aliphatic diamines, such as ethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecanediamine, tetradecanediamine, pentadecanediamine, hexadecanediamine, heptadecanediamine, octadecanediamine, nonadecanediamine, eicosanediamine, 2-methyl-1,8-octanediamine, and 2,2,4/2,4,4-trimethylhexamethylenediamine; alicyclic diamines, such as 1,3-/1,4-cyclohexyldiamine, bis(4-aminocyclohexyl)methane, bis(4-aminocyclohexyl)propane, bis(3-methyl-4-aminocyclohexyl)methane, (3-methyl-4-aminocyclohexyl)propane, 1,3-/1,4-bisaminomethylcyclohexane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, and norbornanedimethyleneamine; aromatic diamines, such as m-/p-xylylenediamine; and the like. Among these, diamine having more than 6 carbon atoms is preferable.

Examples of the dicarboxylic acid include aliphatic dicarboxylic acids, such as oxalic acid, masonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, and eicosanedioic acid; alicyclic dicarboxylic acids, such as 1,3-/1,4-cyclohexanedicarboxylic acid, dicyclohexanemethane-4,4'-dicarboxylic acid, and norbornanedicarboxylic acid; aromatic dicarboxylic acids, such as isophthalic acid, terephthalic acid, and 1,4-/1,8-/2,6-/2,7-naphthalenedicarboxylic acid; and the like. Among these, dicarboxylic acid having more than 6 carbon atoms is preferable.

Examples of the lactam include ε-caprolactam, enantholactam, undecanelactam, dodecanelactam, α-pyrrolidone, α-piperidone, and the like. Furthermore, examples of the aminocarboxylic acid include 6-aminocaproic acid, 7-aminoheptanoic acid, 9-aminononanoic acid, 11-aminoundecanoic acid, and 12-aminododecanoic acid. Among these, lactam and aminocarboxylic acid having more than 6 carbon atoms are preferable.

Examples of the homopolymer of the polyamide resin having a structural unit having more than 6 carbon atoms per 1 amide group include polyundecanoic acid lactam (polyamide 11), polylauryllactam (polyamide 12), polytetramethylene dodecamide (polyamide 412), polypentamethylene azelamide (polyamide 59), polypentamethylene sebacamide (polyamide 510), polypentamethylene dodecamide (polyamide 512), polyhexamethylene azelamide (polyamide 69), polyhexamethylene sebacamide (polyamide 610), polyhexamethylene dodecamide (polyamide 612), polynonamethylene adipamide (polyamide 96), polynonamethylene azelamide (polyamide 99), polynonamethylene sebacamide (polyamide 910), polynonamethylene dodecamide (polyamide 912), polydecamethylene adipamide (polyamide 106), polydecamethylene azelamide (polyamide 109), polydecamethylene decamide (polyamide 1010), polydecamethylene dodecamide (polyamide 1012), polydodecamethylene adipamide (polyamide 126), polydodecamethylene azelamide (polyamide 129), polydodecamethylene sebacamide (polyamide 1210), polydodecamethylene dodecamide (polyamide 1212), polyamide 122, and the like.

Examples of the copolymer of the polyamide resin having a structural unit having more than 6 carbon atoms per 1 amide group include caprolactam/hexamethylene diaminoazelaic acid copolymers (polyamide 6/69), caprolactam/hexamethylene diaminosebacic acid copolymers (polyamide 6/610), caprolactam/hexamethylene diaminoundecanoic acid copolymers (polyamide 6/611), caprolactam/hexamethylene diaminododecanoic acid copolymers (polyamide 6/612), caprolactam/aminoundecanoic acid copolymers (polyamide 6/11), caprolactam/lauryllactam copolymers (polyamide 6/12), caprolactam/hexamethylene diaminoadipic acid/lauryllactam (polyamide 6/66/12), caprolactam/hexamethylene diaminoadipic acid/hexamethylene diaminosebacic acid (polyamide 6/66/610), and caprolactam/hexamethylene diaminoadipic acid/hexamethylene diaminododecanedicarboxylic acid (polyamide 6/66/612), and the like.

These homopolymers and copolymers can be used alone or in the form of a mixture.

Among these, from the perspectives of dimensional stability upon water absorption, impact strength, and surface strength, at least one type selected from the group consisting of polyamide 11, polyamide 12, polyamide 610, polyamide 612, polyamide 6/12, and polyamide 6/66/12 is preferable, and at least one type selected from the group consisting of polyamide 11, polyamide 12, polyamide 610, and polyamide 612 is more preferable.

The molecular weight of the polyamide resin, in terms of the number average molecular weight, is 20000 to 40000, preferably 22000 to 38000, and more preferably 23000 to 36000. The number average molecular weight within the range described above of the polyamide resin can achieve even better abrasion resistance after water absorption.

The relative viscosity of the polyamide resin is not particularly limited; however, the relative viscosity obtained by dissolving 1 g of a polymer in 100 mL of 96% concentrated sulfuric acid and performing measurement at 25° C. is preferably 1.8 to 5.0, and more preferably 2.0 to 3.5. When the relative viscosity is not more than the upper limit of the numerical range described above, excellent processability tends to be obtained, and when the relative viscosity is not less than the lower limit described above, mechanical strength tends to be further enhanced.

The content of the polyamide resin relative to the total amount of the polyamide resin composition is preferably 40 mass % to 85 mass %, more preferably 55 mass % to 80 mass %, and even more preferably 65 mass % to 75 mass %, from the perspectives of mechanical properties and dimensional stability upon water absorption.

Glass Fiber

The glass fiber is not particularly limited as long as the glass fiber has a non-circular cross section. "Non-circular cross section" refers to, in a cross section that is perpendicular to the length direction of a glass fiber, a shape having a major axis that connects two points, by which the distance therebetween becomes greatest among two points on the circumference of the cross section, and a minor axis that is a distance between two points on the circumference of the cross section that intersect with a straight line that makes the distance between the two points greatest among straight lines that are orthogonal to the major axis, and the lengths of the major axis and the minor axis are different each other. The ratio of the major axis to the minor axis of the glass fiber needs to be more than 1. From the perspective of mechanical characteristics, for example, the ratio is 1.2 to 10, preferably 1.5 to 6, and more preferably 1.7 to 4.5.

The cross-sectional shape of the glass fiber is not particularly limited, and is typically a cocoon-like, elliptical, semicircular, arc-like, rectangular, parallelogram, or similar shape of these. Practically, from the perspectives of fluidity, mechanical characteristics, and low warpage, a cocoon-like, elliptical, or rectangular shape is preferable. For the cross-sectional shape of the glass fiber, for example, description in Japanese Patent Application Kokai Publication No. S62-268612 (unexamined, published Japanese patent application) can be used as a reference.

The thickness of the glass fiber is not particularly limited. The minor axis of the glass fiber is typically 0.5 μm to 25 μm, and the major axis is 1.25 μm to 300 μm. The fiber length of the glass fiber is typically 1 mm to 15 mm, preferably 1.5 mm to 12 mm, and more preferably 2 mm to 6 mm.

The aspect ratio obtained by dividing the fiber length by the average value of the major axis and the minor axis of the glass fiber is typically 10 or more and, from the perspectives of rigidity, mechanical strength, and fluidity, is preferably 15 to 100.

Examples of the glass constituting the glass fiber include glasses formed from compositions of A-glass, C-glass, E-glass, and the like. The glass constituting the glass fiber is preferably E-glass from the perspective of thermal stability of the polyamide resin. Furthermore, the glass fiber may be subjected to surface treatment by using a silane coupling agent, a titanium coupling agent, or another high-molecular-weight or low-molecular-weight surface treating agent. Due to the surface treatment, dispersibility and adhesion in the polyamide resin are enhanced.

The content of the glass fiber relative to the total amount of the polyamide resin composition is 15 mass % to 60 mass % and, from the perspectives of impact strength, dimensional stability upon water absorption, and surface hardness, is preferably 20 mass % to 45 mass %, and more preferably 25 mass % to 35 mass %.

To the polyamide resin composition, other components, such as functionality imparting agents, such as plasticizers, impact-resistant materials, heat-resistant materials, foaming agents, weather-resistant agents, nucleating agents, crystallization promoters, releasing agents, lubricants, antistatic agents, flame retardants, flame retardant auxiliaries, pigments, and dyes, can be blended appropriately in the range that does not impair the effect of the present invention.

The polyamide resin composition is produced by melt-kneading the polyamide resin and the predetermined amount of the glass fiber having a non-circular cross section described above by using a uniaxial or biaxial extruder, a Banbury mixer, or the like.

A desired molded body can be obtained by molding the obtained polyamide resin composition. As the molding method, an extrusion molding method, blow molding method, injection molding method, or the like can be employed.

The polyamide resin composition is used for gears, pullies, cams, axle bearings, cable housings, and the like, on automobiles or machines, as well as for components that require similar functionalities as those of gears, pullies, cams, axle bearings, cable housings, and the like, on automobiles or machines.

EXAMPLES

The present invention is more specifically described below using examples and comparative examples; however, the present invention is not limited to these examples. The method of measuring the physical properties of the resins and the molded products used in the examples and the comparative examples are described below.

(1) Charpy impact strength: Edgewise impact test was performed using a test sample that had a type A notch and that had a thickness of 4 mm at room temperature in accordance with ISO 179-1. (n=10)

(2) Rate of dimensional change upon water absorption: A molded product having a size of 200×40×3 mm was produced by using the Injection Molding Machine SE-100D, manufactured by Sumitomo Heavy Industries, Ltd., and left for 48 hours in a vacuum. The distance between guide lines that had been transferred onto the molded product surface was then measured by using a microscope, manufactured by Olympus Corporation, and used as the dimension before water absorption treatment.

After the molded product was left in an atmosphere at 23° C. and 50% RH for 168 hours, the distance between the guide lines that had been transferred onto the molded product surface was measured by using a microscope, manufactured by Olympus Corporation, and used as the dimension after water absorption treatment.

Using the dimension before the water absorption treatment and the dimension after the water absorption treatment obtained as described above, the rate of dimensional change upon the water absorption was calculated by the following calculation formula.

Rate of dimensional change upon water absorption= (dimension after water absorption treatment− dimension before water absorption treatment)/ dimension before water absorption treatment× 100

(3) Rockwell hardness R scale: The hardness was measured by using R scale in accordance with ISO 2039-2. The measurements of the Rockwell hardness R scale were performed before treatment in water (untreated) and after the treatment in water of the test sample. As the treatment in water, the test sample was subjected to immersion treatments for 2 hours and 6 hours in a constant-temperature water tank T104NB, manufactured by Thomas Kagaku Co., Ltd., set at a temperature of 80° C.

(4) Molecular weight: GPC measurement was performed under the following conditions by using HLC-802A, manufactured by Tosoh Corporation, and the number average molecular weight was calculated based on calibration with PMMA.

Column: Shodex HFIP-LG+ HFIP-806M
Eluent: HFIP—10 mM $CF_3COONa$
Temperature: 40° C.
Flow rate: 0.8 mL/min
Sample concentration: approximately 0.1 wt/vol %
Injection amount: 500 μL (5) Abrasion resistance upon water absorption (amount of abrasion after treatment in water): A molded product having a size of 40 mm×50 mm×3 mmt was produced by using the Injection Molding Machine SE-100D, manufactured by Sumitomo Heavy Industries, Ltd., and used as the test sample. As an accompanying material, a hollow material having the outer diameter of 25.6 m, the inner diameter of 20 mm, and the length of 15 mm was produced from a S45C material. EFM-HI-EN, manufactured by A&D Company, Limited, was used as a friction and wear tester. The test sample was subjected to immersion treatments for 2 hours and 6 hours in a constant-temperature water tank TIO4NB, manufactured by Thomas Kagaku Co., Ltd., set at a temperature of 80° C. After the treatment, water on the surface of the test sample was wiped, and the test sample was left in a vacuum for 48 hours. Using the sample after the treatment in water at 80° C. obtained as described above, the initial weight of the test sample was measured. Thereafter, the test sample was attached to the bottom part of the tester and the accompanying material was attached to the upper part of the tester to perform the test by applying a test load of 25 kgf and a peripheral velocity of 100 mm/sec for 240 minutes. After the test, the weight of the test sample was measured. Using the difference between the initial weight after the treatment in water at 80° C. and the weight after the test obtained as described above, the amount of abrasion was calculated.

Polyamide resin

PA6-1: Polyamide 6 having the number average molecular weight of 13000

PA6-2: Polyamide 6 having the number average molecular weight of 30000

PA66-1: Polyamide 66 having the number average molecular weight of 20000

PA66-2: Polyamide 66 having the number average molecular weight of 34000

PA12-1: Polyamide 12 having the number average molecular weight of 24000

PA12-2: Polyamide 12 having the number average molecular weight of 30000

PA12-3: Polyamide 12 having the number average molecular weight of 35000

PA12-4: Polyamide 12 having the number average molecular weight of 14000

PA12-5: Polyamide 12 having the number average molecular weight of 41000

Glass fiber

GF-1: A glass fiber having a rectangular cross-sectional shape (CSG3PA-8208, manufactured by Nitto Boseki Co., Ltd.)

The ratio of the major axis to the minor axis: 4, the fiber size: 7×28 μm

GF-2: A glass fiber having a circular cross-sectional shape (ECSO3T249H, manufactured by Nippon Electric Glass Co., Ltd.)

The fiber diameter: 10.5 μm

Examples 1 to 6 and Comparative Examples 1 to 7

The polyamide resin and the glass fiber shown in Table 1 were melt-kneaded by using the twin-screw kneader TEX44HCT to produce a target polyamide resin composition pellet.

Thereafter, the obtained pellet was injection molded at a cylinder temperature of 290° C. and a mold temperature of 80° C. to produce various test samples, by which various physical properties were evaluated. The obtained results are shown in Table 2.

TABLE 1

|  | Polyamide resin | | | Glass fiber | | |
| --- | --- | --- | --- | --- | --- | --- |
|  | Type | Molecular weight | Content (mass %) | Type | Cross-sectional shape | Content (mass %) |
| Example 1 | PA12-2 | 30,000 | 75 | GF-1 | Non-circular | 25 |
| Example 2 | PA12-2 | 30,000 | 70 | GF-1 | Non-circular | 30 |
| Example 3 | PA12-2 | 30,000 | 65 | GF-1 | Non-circular | 35 |
| Example 4 | PA12-2 | 30,000 | 50 | GF-1 | Non-circular | 50 |
| Example 5 | PA12-1 | 24,000 | 70 | GF-1 | Non-circular | 30 |
| Example 6 | PA12-3 | 35,000 | 70 | GF-1 | Non-circular | 30 |
| Comparative Example 1 | PA12-2 | 30,000 | 70 | GF-2 | Circular | 30 |
| Comparative Example 2 | PA12-1 | 24,000 | 70 | GF-2 | Circular | 30 |
| Comparative Example 3 | PA66-1 | 20,000 | 70 | GF-1 | Non-circular | 30 |
| Comparative Example 4 | PA6-1 | 13,000 | 70 | GF-1 | Non-circular | 30 |
| Comparative Example 5 | PA12-2 | 30,000 | 90 | GF-1 | Non-circular | 10 |
| Comparative Example 6 | PA6-2 | 30,000 | 70 | GF-1 | Non-circular | 30 |
| Comparative Example 7 | PA66-2 | 34,000 | 70 | GF-1 | Non-circular | 30 |
| Comparative Example 8 | PA12-4 | 14,000 | 70 | GF-1 | Non-circular | 30 |
| Comparative Example 9 | PA12-5 | 41,000 | 70 | GF-1 | Non-circular | 30 |

TABLE 2

|  | Charpy impact strength (kJ/m$^2$) | Rate of dimensional change upon water absorption (MD direction) (%) | Rate of dimensional change upon water absorption (TD direction) (%) | Rockwell hardness R scale (untreated) | Rockwell hardness R scale (after 2 hours of treatment in water) | Rockwell hardness R scale (after 6 hours of treatment in water) | Amount of abrasion after 2 hours of treatment in water (mg) | Amount of abrasion after 6 hours of treatment in water (mg) |
| --- | --- | --- | --- | --- | --- | --- | --- | --- |
| Example 1 | 30 | 0.1 | 0.2 | 112 | 110 | 110 | 5 | 6 |
| Example 2 | 28 | 0.1 | 0.1 | 111 | 112 | 112 | 4 | 5 |
| Example 3 | 28 | 0.1 | 0.1 | 112 | 114 | 114 | 4 | 4 |
| Example 4 | 33 | 0.1 | 0.1 | 116 | 112 | 113 | 5 | 6 |
| Example 5 | 28 | 0.1 | 0.1 | 110 | 112 | 112 | 4 | 4 |
| Example 6 | 31 | 0.1 | 0.1 | 112 | 116 | 116 | 6 | 7 |
| Comparative Example 1 | 24 | 0.1 | 0.3 | 111 | 111 | 111 | 14 | 13 |
| Comparative Example 2 | 22 | 0.1 | 0.3 | 111 | 111 | 110 | 15 | 16 |
| Comparative Example 3 | 12 | 0.2 | 0.3 | 118 | 119 | 116 | 14 | 19 |
| Comparative Example 4 | 12 | 0.3 | 0.5 | 117 | 114 | 113 | 20 | 24 |

TABLE 2-continued

|  | Charpy impact strength (kJ/m²) | Rate of dimensional change upon water absorption (MD direction) (%) | Rate of dimensional change upon water absorption (TD direction) (%) | Rockwell hardness R scale (untreated) | Rockwell hardness R scale (after 2 hours of treatment in water) | Rockwell hardness R scale (after 6 hours of treatment in water) | Amount of abrasion after 2 hours of treatment in water (mg) | Amount of abrasion after 6 hours of treatment in water (mg) |
|---|---|---|---|---|---|---|---|---|
| Comparative Example 5 | 21 | 0.2 | 0.3 | 100 | 100 | 99 | 14 | 15 |
| Comparative Example 6 | 17 | 0.3 | 0.5 | 118 | 115 | 114 | 19 | 23 |
| Comparative Example 7 | 20 | 0.2 | 0.3 | 119 | 118 | 116 | 13 | 17 |
| Comparative Example 8 | 27 | 0.1 | 0.1 | 110 | 110 | 109 | 9 | 10 |
| Comparative Example 9 | 32 | 0.1 | 0.1 | 112 | 113 | 112 | 12 | 13 |

INDUSTRIAL APPLICABILITY

The polyamide resin composition according to the present invention can simultaneously satisfy, with regard to a molded body, suppression of dimensional change upon water absorption, excellent abrasion resistance after water absorption, excellent impact strength, and high surface strength, and is, in particular, favorably used for sliding components and the like. In particular, the polyamide resin composition is favorably used for sliding components, such as gears, bearings, pullies, and axle bearings.

The entire disclosure of Japanese Patent Application No. 2015-200937 (filing date: Oct. 9, 2015) is incorporated herein by reference.

All publications, patent applications, and technical standards mentioned in this specification are herein incorporated by reference to the same extent as if each individual publication, patent application, or technical standard was specifically and individually indicated to be incorporated by reference.

The invention claimed is:

1. A sliding component comprising a resin component consisting of a polyamide resin, and a glass fiber having a non-circular cross section, and the polyamide resin having a structural unit having more than 6 carbon atoms per 1 amide group,
    wherein a number average molecular weight of the polyamide resin is 20000 to 40000, and a content of the glass fiber is 15 mass % to 60 mass %, and
    wherein the polyamide resin is at least one type selected from the group consisting of polyamide 11, polyamide 12, polyamide 612, polyamide 610, polyamide 6/12, and polyamide 6/66/12.

2. The sliding component according to claim 1, wherein the polyamide resin is polyamide 12.

3. The sliding component according to claim 1, wherein the number average molecular weight of the polyamide resin is 23000 to 36000.

4. The sliding component according to claim 2, wherein the number average molecular weight of the polyamide resin is 23000 to 36000.

5. A polyamide resin composition forming a molded sliding component, said composition comprising a glass fiber having a non-circular cross section, and a resin component consisting of a polyamide resin having a structural unit having more than 6 carbon atoms per 1 amide group,
    wherein a number average molecular weight of the polyamide resin is 20000 to 40000, and a content of the glass fiber is 15 mass % to 60 mass %, and
    wherein the polyamide resin is at least one type selected from the group consisting of polyamide 11, polyamide 12, polyamide 612, polyamide 610, polyamide 6/12, and polyamide 6/66/12.

6. The polyamide resin composition according to claim 5, wherein the polyamide resin is polyamide 12.

7. The polyamide resin composition according to claim 5, wherein the number average molecular weight of the polyamide resin is 23000 to 36000.

8. The polyamide resin composition according to claim 6, wherein the number average molecular weight of the polyamide resin is 23000 to 36000.

* * * * *